(12) United States Patent
Park (10) Patent No.: US 7,859,514 B1
(45) Date of Patent: Dec. 28, 2010

(54) MULTI-FUNCTIONAL USER INTERFACE FOR ELECTRONIC DEVICES

(76) Inventor: Young Park, 964 Woodward Park Dr., Suwanee, GA (US) 30024

( * ) Notice: Subject to any disclaimer, the term of this patent is extended or adjusted under 35 U.S.C. 154(b) by 1487 days.

(21) Appl. No.: 11/183,096

(22) Filed: Jul. 19, 2005

(51) Int. Cl.
*G09G 5/00* (2006.01)

(52) U.S. Cl. .................. 345/156; 345/168; 345/169; 345/184; 400/472; 400/485

(58) Field of Classification Search ......... 345/156–172; 400/472, 485, 100
See application file for complete search history.

(56) References Cited

U.S. PATENT DOCUMENTS

| | | | |
|---|---|---|---|
| 5,394,168 A | 2/1995 | Smith, III et al. | |
| 5,984,548 A * | 11/1999 | Willner et al. | 400/472 |
| D438,178 S | 2/2001 | Hames | |
| 6,288,709 B1 | 9/2001 | Willner et al. | |
| 6,394,906 B1 | 5/2002 | Ogata | |
| 6,512,511 B2 * | 1/2003 | Willner et al. | 345/169 |
| 6,557,853 B2 * | 5/2003 | Huettlinger | 273/148 B |
| 6,580,415 B1 | 6/2003 | Kato et al. | |
| 2001/0011991 A1 | 8/2001 | Wang et al. | |

* cited by examiner

*Primary Examiner*—Quan-Zhen Wang
*Assistant Examiner*—Jennifer T Nguyen (57) ABSTRACT

A multi-functional user interface for electronic devices includes a hand-operable controller for providing an interface through which a user can command a peripheral electronic device to perform multiple actions. Such a controller includes an ergonomic housing including a communication link electrically matable to the electronic device. The housing includes a plurality of controls for generating a plurality of control signals based upon a plurality of corresponding user inputs respectively. The housing includes front and rear faces, each including a plurality of controls for generating a plurality of signals based upon a plurality of corresponding user inputs respectively. The device is selectively interchangeable between Internet Mode, Applications Mode, and Word Mode, conveniently enabling a user to use a single input device for a variety of different functions.

12 Claims, 7 Drawing Sheets

MULTI-FUNCTIONAL USER INTERFACE FOR ELECTRONIC DEVICES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to data entry and input devices and, more particularly, to a multi-functional user interface for electronic devices such that a user can instruct the electronic devices to execute web browsing operations, word processing operations, and gaming operations.

2. Prior Art

Keyboard data entry systems and game controllers are known in the art. Some prior art systems are directed to ergonomic keyboard systems wherein the user's hands are substantially vertically oriented when the keyboard is used. Such systems disclose utilizing somewhat standard QWERTY keyboard formats, as opposed to a format which is capable of higher speed data entry. However, such systems do not disclose an ergonomic housing that is adapted to be supported by the two hands of the user while the user operates the key switches during data entry.

Over the years, many prior art systems have presented alternatives to the QWERTY format as a means of increasing typing speed. While those systems would permit a user to type faster, they required a user to learn the new keyboard layout. In spite of the potential typing speed increase, the public has been loath to adopt any keyboard format other than the old QWERTY arrangement. It is clear that once typists become familiar with a keyboard layout, a promised increase in typing speed is not sufficient motivation to learn an additional keyboard arrangement.

During the past decade, there has been a tremendous growth in the use and ownership of computers, game software and video game systems. As a result, children and young adults have become very accustomed to handling and using game controllers that incorporate multidirectional switches. This growing portion of the keyboard-using population is more likely to adopt a keyboard format that is arranged like a game controller, can function as a game controller, is ergonomically designed, allows users to enter data while seated in a reclined position away from a desk, and offers greater typing speed. The limitations of the mouse and keyboard for applications like computer aided design (CAD) and computer games are well known, and a new type of multimedia instrument is urgently needed for input devices so that users are able to interact efficiently with the latest technology on the market.

Accordingly, a need remains for a multi-functional user interface for electronic devices. Such an interface satisfies the above noted shortcomings by providing the functions of a keyboard, mouse, and joystick in one device. Such a device is capable of operating a wide variety of computer programs as well as playing games and is fun and easy to use. The convenience of using one device for the above referenced functions results in cost and time savings for consumers in addition to adding to their enjoyment when using such devices.

BRIEF SUMMARY OF THE INVENTION

In view of the foregoing background, it is therefore an object of the present invention to provide a multi-functional user interface for electronic devices. These and other objects, features, and advantages of the invention are provided by a hand-operable controller for providing a versatile interface through which a user can command a peripheral electronic device to perform multiple functions.

The present invention operates in at least five modes: internet mode, word mode, applications mode, remote control mode, internet telephone mode, for example. Although typing with the present invention is not as fast as a conventional word processor, it is much faster than typing with a cell phone or PDAs. Also, the voice recognition system of the present invention enables a user to quickly and effectively input alphanumerical characters on a display screen. Accordingly, a user has more than 60 available keys, which can be programmed to fit their necessary needs. Of course, all PC games can be experienced as a console game including real life simulations commonly available through the X-Box and Play Station II.

Such a controller includes an ergonomic housing including a communication link electrically matable to the electronic device. The housing is sized and shaped to be held in a user's hands during operating conditions and includes a plurality of controls for generating a plurality of control signals based upon a plurality of corresponding user inputs respectively. The housing has a general bat shape and further includes integrally opposed arms defining bat wings respectively. The housing further has top and bottom surfaces wherein selected ones of the controls are disposed on the top surface and other ones of the controls are disposed on the bottom surface respectively.

The controller further includes a control circuit operably mated with the controls for processing and transmitting the control signals to the electronic device during operating conditions. The control circuit includes a mechanism for allowing the user to independently operate at least one controller function such that the user can command the electronic device to perform a plurality of tasks unique to a joystick, a mouse, and a keyboard respectively.

The housing includes at least one bay for receiving the control circuit therein such that the user can selectively remove the control circuit as desired. An eyelet is integrally connected to the housing and a flexible cord may be positioned through the eyelet so that the user can wear the controller around a selected portion of the user's body. The independent operating mechanism preferably includes a programmed computer software product for enabling the electronic device to perform a plurality of word processing tasks for displaying alphanumeric characters.

In an alternate embodiment, such a mechanism may further include a programmed computer software product for enabling the electronic device to perform a plurality of Internet browsing tasks for accessing at least one web page using hypertext transfer protocol. In yet another alternate embodiment, the independent operating mechanism may include a programmed computer software product for enabling the electronic device to perform a plurality of gaming tasks for controlling a gaming figure during game play.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-7 by the reference numeral 10 and is intended to provide a multi-functional user interface for electronic devices. It should be understood that the device 10 may be used to interface many different types of electronic devices and should not be limited to only video games. Initially referring to FIGS. 1 and 2, the device 10 includes a hand-operable controller 20 for providing a versatile interface through which a user can command a peripheral electronic device to perform multiple actions. Such a controller 20 includes an ergonomic housing 30. The housing 30 is sized and shaped to be held in a user's hands during operating conditions and includes a plurality of controls collectively referred to as item 40 and described in greater detail herein below for generating a plurality of control signals based upon a plurality of corresponding user inputs respectively. Such controls 40 are easily manipulated by a user's fingers, while still maintaining control of the device 10.

Figure 1:
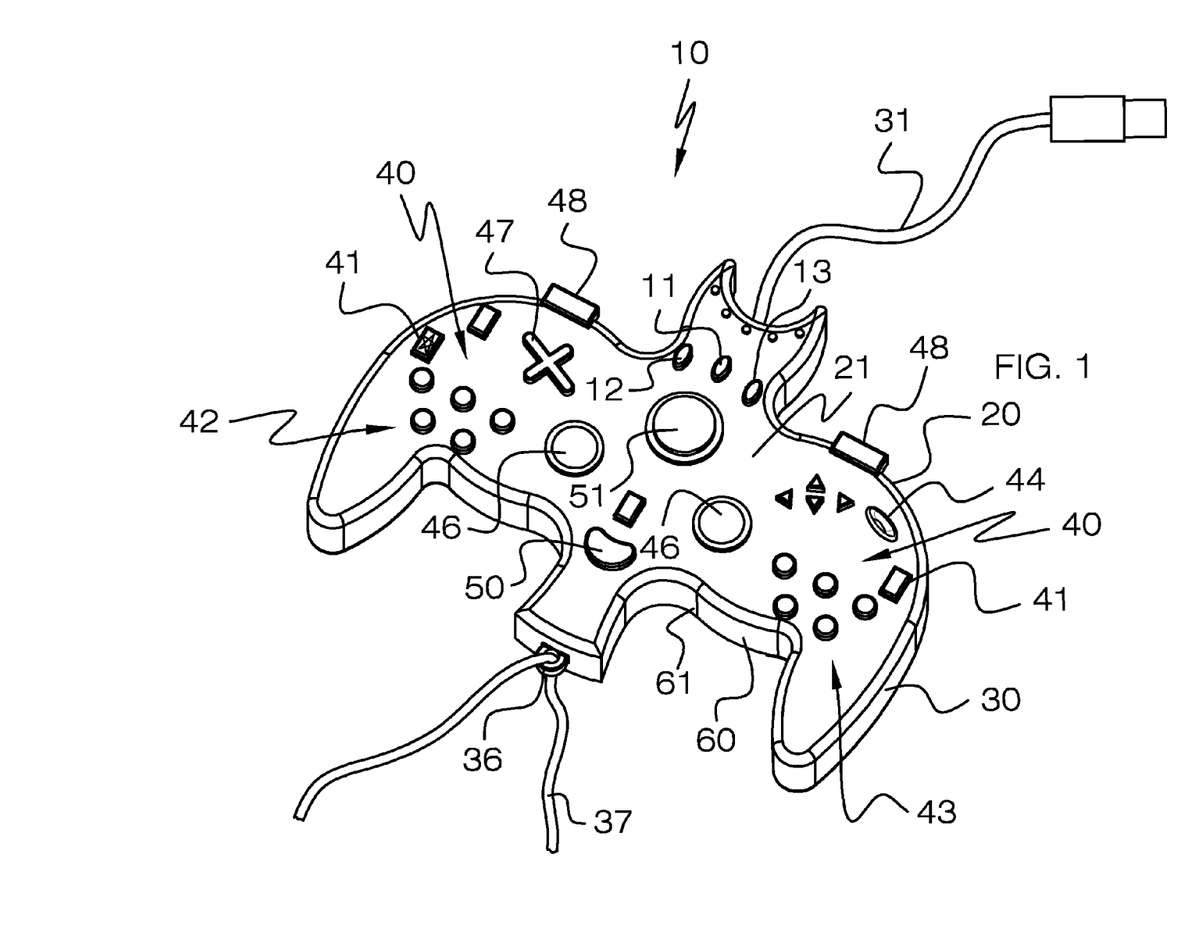
FIG. 1 is a perspective view showing the front face and plurality of controls of a multifunctional user interface for electronic devices, in accordance with the present invention.
Figure 2:
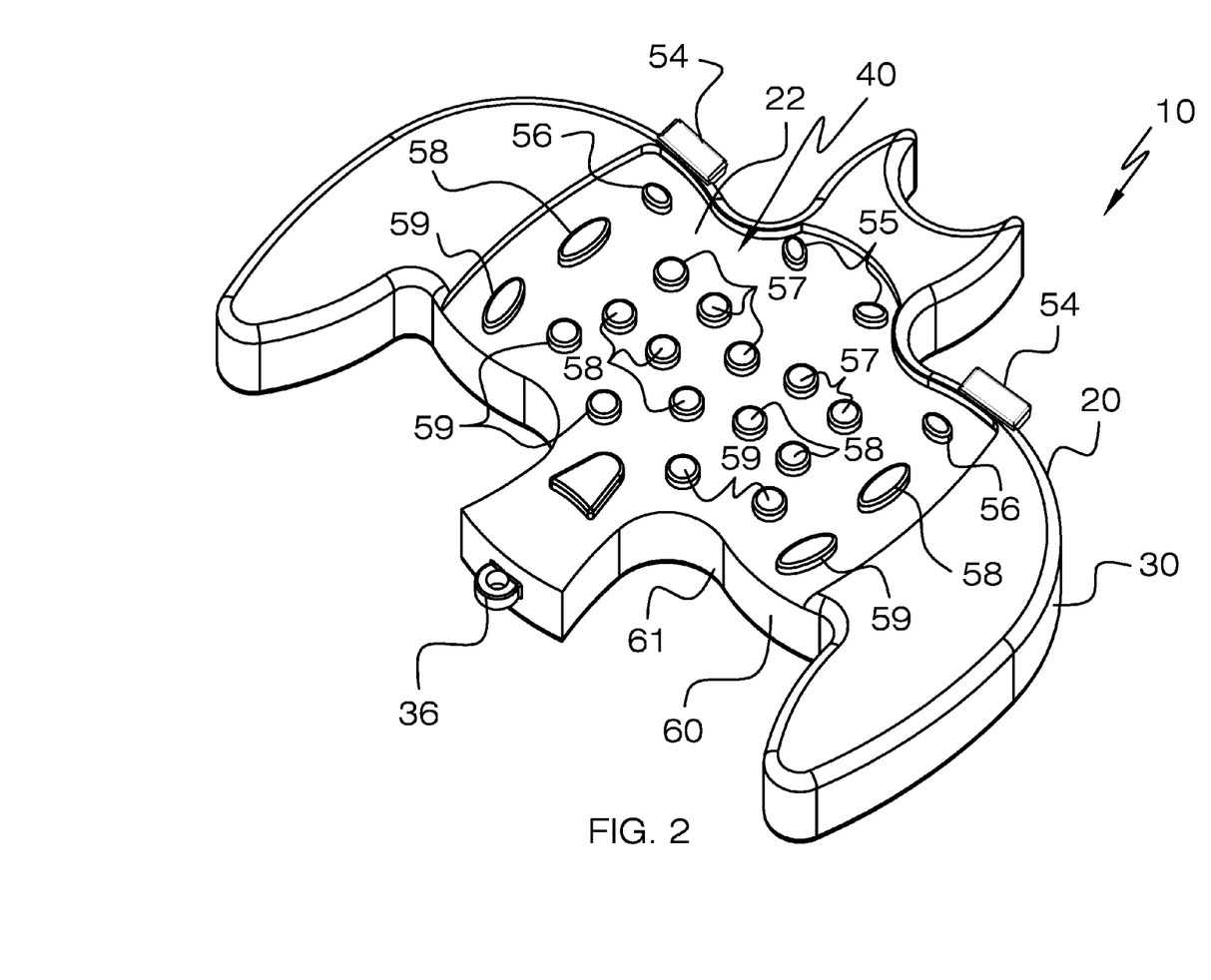
FIG. 2 is a perspective view of the rear face and the plurality of controls of the present invention shown in FIG. 1.

A control circuit 60 is operably mated with such controls 40 for processing and transmitting control signals to the electronic device during operating conditions. The control circuit 60 includes a mechanism for allowing the user to independently operate at least one controller function such that the user can command the electronic device to perform a plurality of tasks unique to a joystick and a mouse and a keyboard respectively. The controls 40 are selectively programmable between a Word mode, an Internet mode, an Applications mode, and a Remote Control mode so that the user can interchangeably perform the plurality of tasks with the independent operating mechanism.

Figure 7:
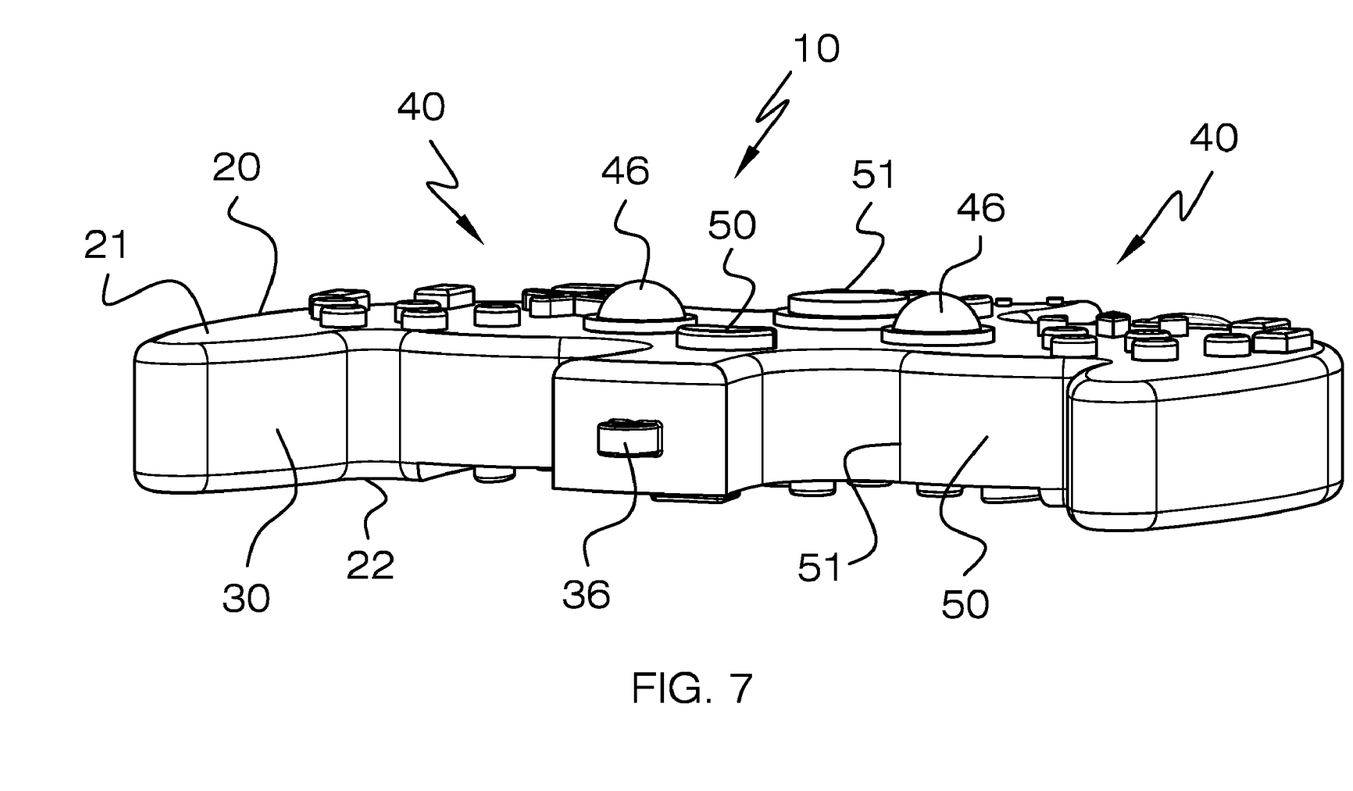
FIG. 7 is a rear elevational view of the present invention shown in FIG. 1.

The housing 30 further has front 21 and rear 22 faces wherein selected ones of the controls 40 are disposed on the front face 21 and other ones of the controls 40 are disposed on the rear face 22 respectively. The housing 30 also includes at least one bay 61 for receiving the control circuit 60 therein such that a user can selectively program the control circuit 60 as desired. The rear face 22 has a groove formed therein such that the device 10 may be laid flat on a surface so that the controls 40 may be disposed thereon and not contact the surface, as shown in FIG. 7. The device 10 is selectively interchangeable between Word, Internet Mode, Applications Mode, and Remote Control Mode, conveniently enabling a user to use a single input device for a variety of different functions.

Figure 3:
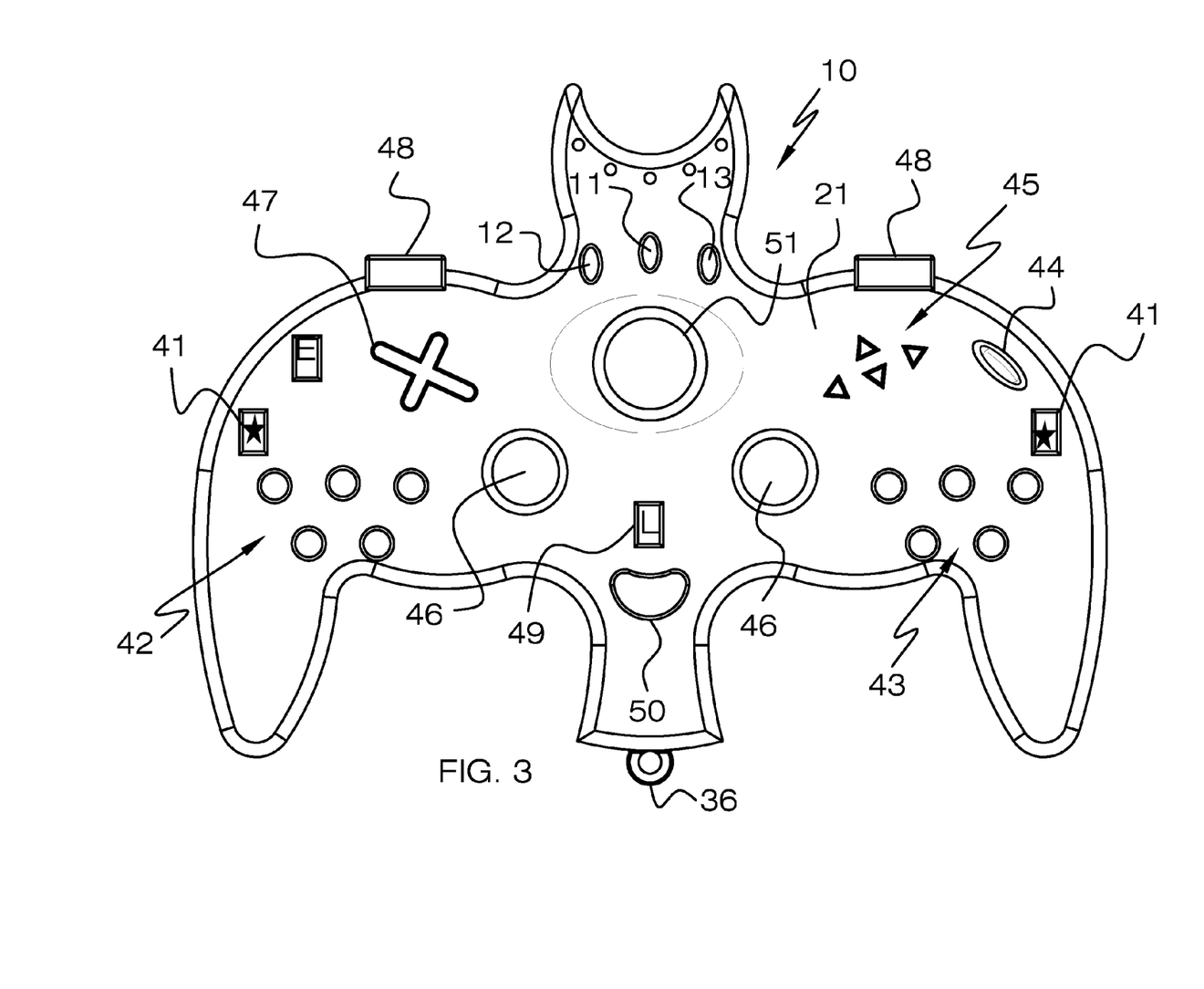
FIG. 3 is a top plan view of the present invention showing the front face at the Internet Mode.
Figure 4:
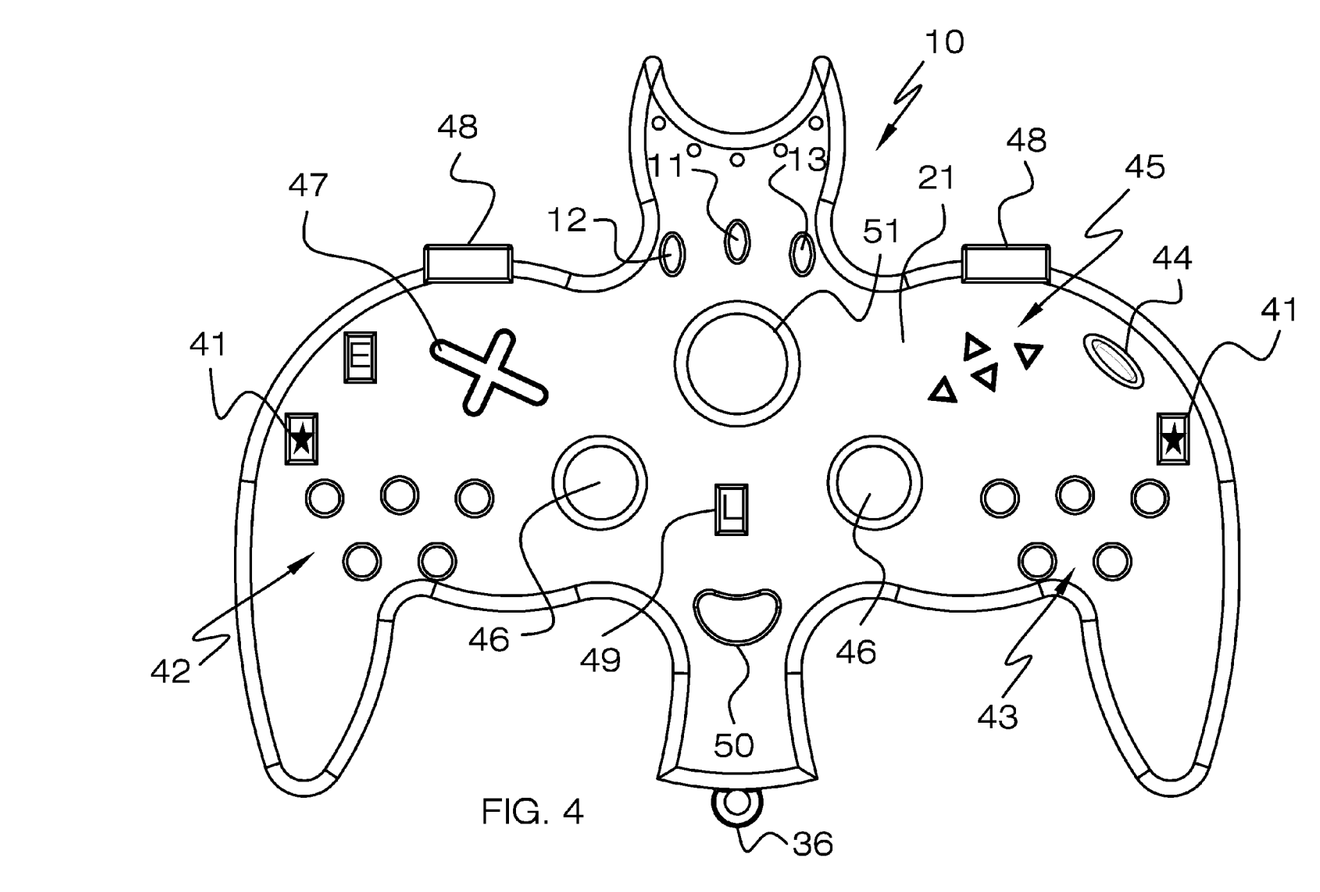
FIG. 4 is a top plan view of the present invention showing the front face at the Word Mode.

Referring to FIGS. 3 and 4, in more detail, a front face of the controller 20 is shown wherein the "*" keys 41 are adapted to a non-engaged or out position. Such "*" keys 41 may be selectively toggled between disengaged and engaged positions. The position of the "*" key 41 defines the Internet mode or the Applications mode. A group of controls 42 are situated subjacent the "*" key 41 on the left side of the controller 20. In the Internet mode, shown in FIG. 3, such controls 42 allow a user to maximize, minimize, and close a web browser window and are identified as "☐", "two overlapping rectangles," "X," "F4," and "He". In the Word mode, shown in FIG. 4, such keys are identified as the letters IJ, KL, MN, OP, and QR. On the right side of the controller 20, there are a second series of controls 43 which can be programmed according to each user's needs by simultaneously engaging the (*) button 41 and at least one of the controls in the second group 43. In the Internet Mode, the keys 43 are identified as "BOOK," "SEARCH," "LIST," "STOP," and "P." In the Word mode, such keys 43 are identified as ST, UV, WX, YZ, and "www".

Still referring to FIGS. 3 and 4, advantageously, the device 10 can learn a series of commands unique to a user such that multiple users can employ the device 10 in a variety of ways. A scroll button 44 is located on the upper right corner of the controller front face 21 and is functional in a conventional manner. Adjacent the scroll button 44, there are a series of juxtaposed controls 45 defining up, down, left, and right movements such that the user may position the cursor between orthogonal positions.

A pair of track balls 46 are simultaneously operable by the user for enhancing the ergonomic and functional ability of such track balls 46. For example, a user may quickly and efficiently move a cursor across the display by cooperatively the rolling the trackballs 46 in opposing or complimentary directions. To the left of the track balls 46 is a multi-flange control 47 for allowing the user to scroll backwards and forwards between web pages. In the Internet mode, such a control 47 is identified as "HOME," "FRONT," "ALL," and "REAR". In the Word mode, such a control 47 represents the letter groups AB, CD, EF, and GH. Thus, the (*) controls may operate similar to a conventional "alt" key, "control" key, and "shift" key, on a conventional keyboard. Therefore, by engaging and disengaging the asterisk key, all the letters and characters commonly provided on a conventional keyboard can be executed via the front face of the controller 20.

Still referring to FIGS. 3 and 4, a pair of controls 48 are oppositely disposed along a top edge 23 of the front face 21. Such controls 48 identify a "left" button employed on a conventional mouse. A third "left" button 49 is positioned generally medially between the trackballs 46 and may be used in lieu of engaging the first 48A and second 48B "left" button controls. An operating mode control 50 is located subjacent the third left button control 49 and allows the user to toggle the present invention 10 to the internet mode. When the (*) buttons 41 are at an engaged position (or in positions) the set of arrow keys 45 functions to scroll the page up and down as well as move the cursor between a home and an end position commonly employed by a conventional keyboard. A central control 51 is disposed above the track balls 46 and operates to function as a media player wherein the user can effectively play, stop, pause, skip, fast forward, and rewind an audio file executed by a CPU.

In the Applications Mode, two phenomes may be selectively outputted using one key, enabling a user to input the entire alphabet while using approximately half the number of keys. For example, pressing the AB key alone would result in the input of A. Pressing the AB key and one of the "*" keys would result in the input of the letter B. For the CD key, pressing the CD key alone would result in the input of the letter C. Pressing the CD key and one of the "*" keys would result in the inputting of the letter D. The "*" keys are analogous to the SHIFT keys on a conventional keyboard. The positioning of one "*" key on each side of the device 10 makes it easy to press this key in conjunction with any other key. One advantage of the device 10 over conventional keyboards is that the right hand "*" key only works with left hand phoneme keys and vice versa. Hence, one key would be pressed with each hand, resulting in faster and more accurate character input when compared with conventional keyboards.

In the Internet Mode, pressing the AB key would result in the input HOME. Pressing the CD key would result in the input BACKWARD. Other Word Mode/Internet Mode equivalents would be: EF/FORWARD; IJ/FULL SCREEN; MN/SCREEN CLOSING; OR/MY COMPUTER; ST/FAVORITE; UV/SEARCH; WX/LIST; and YZ/STOP.

Pressing the "A" key in conjunction with a phoneme key (AB, CD, etc.) would result in an application mode function. The numerical functions outputted would be equal to the place of each letter in the alphabet. Therefore, pressing AB and A would result in Function 1 and Function 2. Pressing CD and A would result in Function 3 and Function 4, etc.

Figure 5:
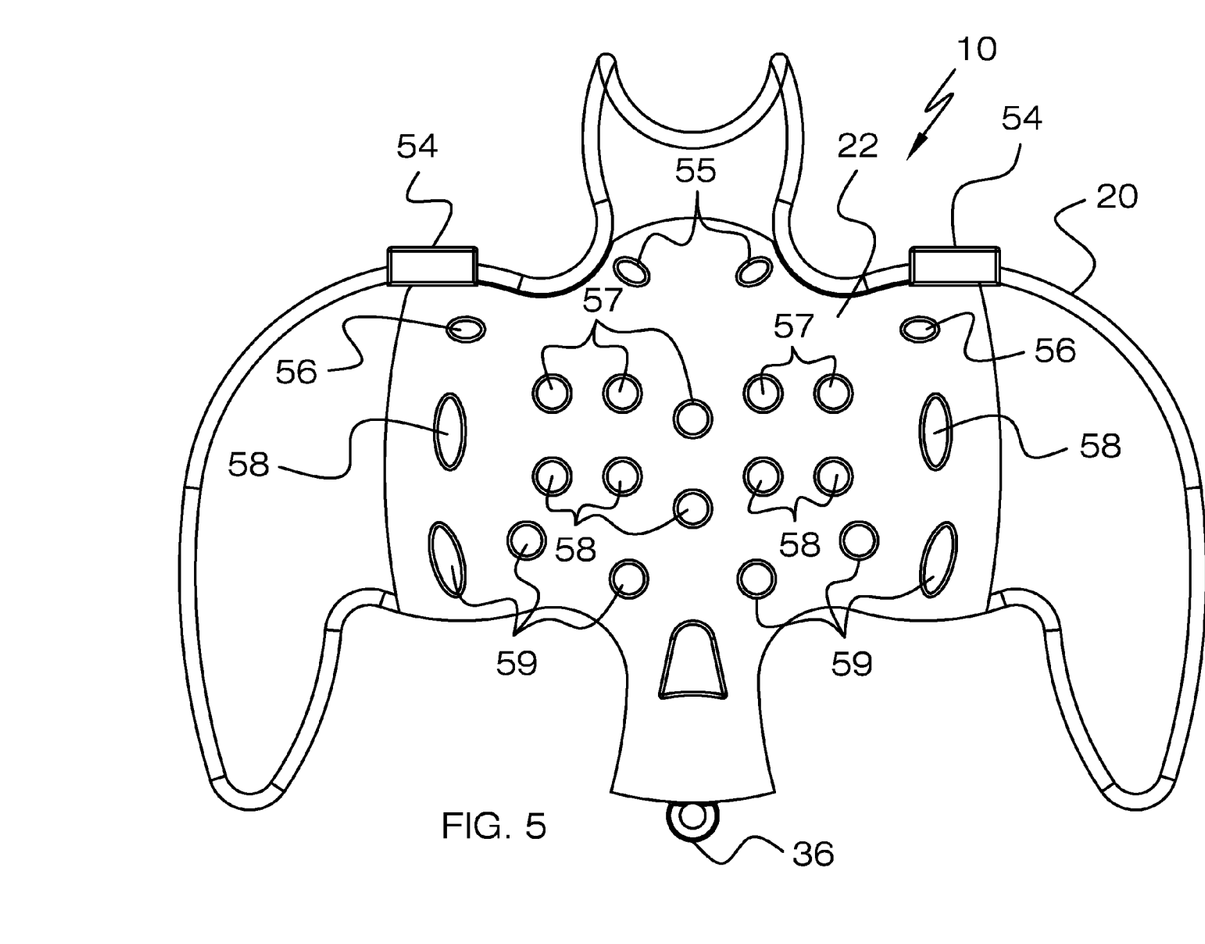
FIG. 5 is a bottom view of the present invention showing the rear face at the Internet Mode.
Figure 6:
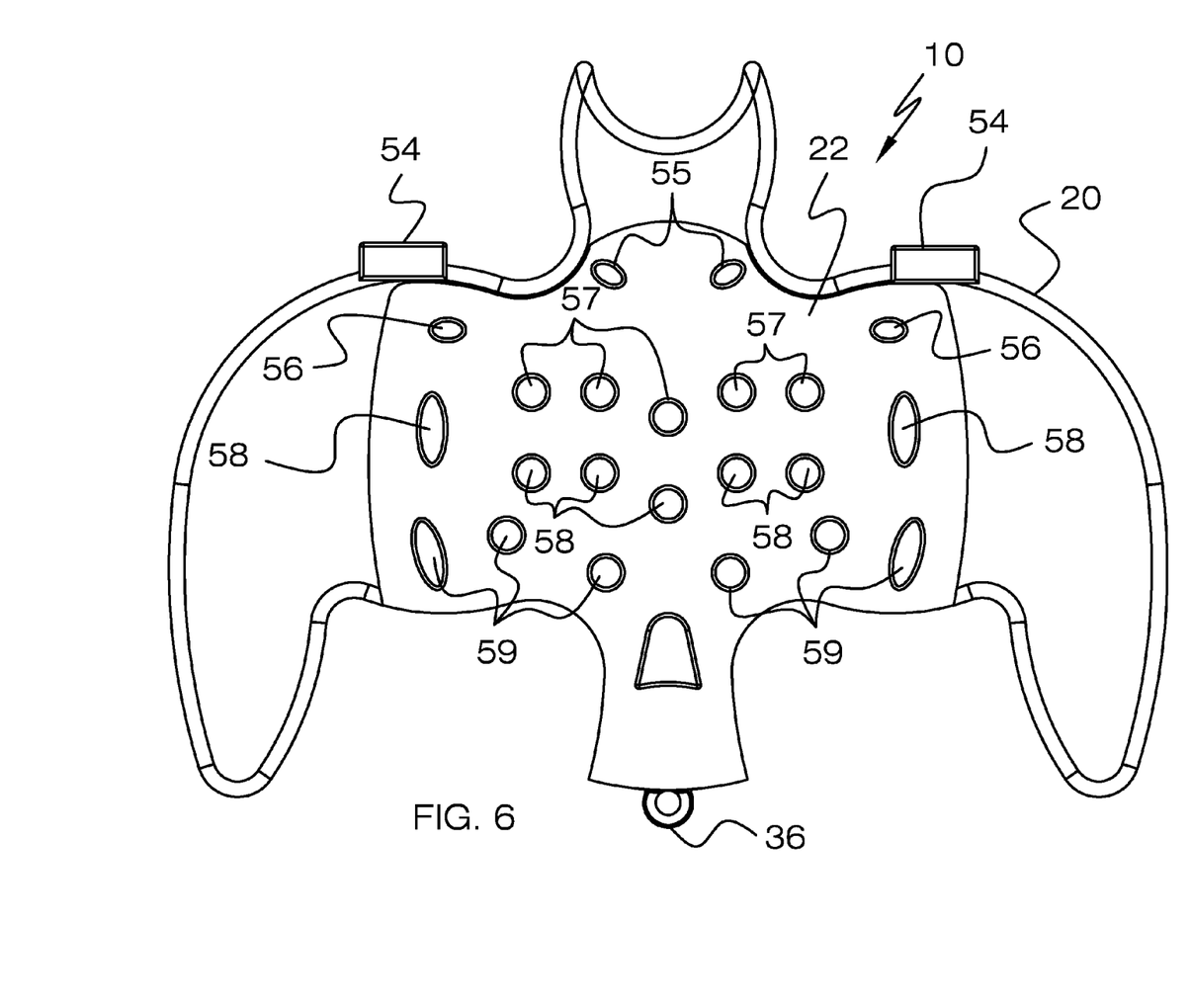
FIG. 6 is a bottom view of the present invention showing the rear face at the Word mode.

Now referring to FIGS. 5 and 6, a rear face 22 of the controller 20 is shown wherein the (*) key is disengaged and engaged respectively. Such figures illustrate the controller 20 at an Internet mode and Word mode respectively. The rear face 22 of the controller 20 includes a plurality of controls selectively operable when the asterisk control 41 is at a disengaged position. Such controls define numerical values as well as the shift and space keys. The Word mode, shown in FIG. 6, includes at least one "R" key 54 and five rows of keys identified as follows: Row one 55: "ESC" and "DEL"; Row two 56: "w" and "TAB"; Row three 57: "1," "2," "3," "4," and "5"; Row four 58: "SHIFT," "6," "7," "8," "9," "0," and "SHIFT." Row five 59: "SPACE," "Ch," "WE," "WO," "#," "SPACE," and "e". The rear face 22, in the Internet mode, includes the same keys as the Word mode.

Referring to FIGS. 1-6, the housing 30 has a general bat shape and further includes integrally opposed arms 32 defining bat wings respectively. Such a shape allows a user to firmly and comfortably grip and operate the device 10, enabling a user to work or play for longer periods of time than might otherwise be possible with a conventional input device. The shape and design of conventional keyboards prohibits a user from holding it with both hands and inputting data. In addition, the large number of keys on a conventional keyboard makes it less than desirable for game applications where a limited number of keys are used frequently. Conventional joysticks have been developed for use with some computer games, however, their application is limited because alphanumeric characters cannot be input via the joystick.

Again referring to FIG. 1, the controller 20 further includes a communications link 31 for processing and transmitting control signals to the electronic device during operating conditions. An eyelet 36 may be integrally connected to the housing 30 and a flexible cord 37 may be positioned through the eyelet 36 so that the user can wear the controller 10 around a selected portion of the user's body. Such a cord 37 enables a user to easily transport the device 10 so that it may be used in a car, on vacation, or while out of town on business.

Of course, such a device may further include a programmed computer software product for enabling the electronic device to perform a plurality of Internet browsing tasks for accessing at least one web page using hypertext transfer protocol, as well known in the industry. The independent operating mechanism may further include a programmed computer software product for enabling the electronic device to perform a plurality of gaming tasks for controlling a gaming figure during game play, as also well known in the industry.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hand-operable controller for providing a versatile interface through which a user can command a peripheral electronic device to perform multiple actions, said controller comprising:

an ergonomic housing including a communication link electrically matable to the electronic device, said housing being sized and shaped to be held in a user's hands during operating conditions, said housing including a plurality of controls for generating a plurality of control signals based upon a plurality of corresponding user inputs respectively, said housing having a general bat shape including integrally opposed arms defining bat wings respectively; and a control circuit operably mated with said controls for processing and transmitting said control signals to the electronic device during operating conditions, said control circuit including means for allowing the user to independently operate at least one controller function such that the user can command the electronic device to perform a plurality of tasks unique to a joystick and a mouse and a keyboard respectively, said controls being selectively programmable between an application mode and an internet mode and a word mode so that the user can interchangeably perform the plurality of tasks with said independent operating means;

wherein said controls include a plurality of keys, wherein the plurality of keys are (*) keys and a first group of controls comprising AB, CD key;

when said controller is in said applications mode, two phenomes are selectively outputted using one of said keys in combination with one of said first group of controls and thereby input an entire alphabet while using approximately half of said controls; and when in the internet mode, pressing the AB key would result in the input HOME, Pressing the CD key would result in the input BACKWARD.

2. The controller of claim 1, wherein said housing comprises:
at least one bay for receiving said control circuit therein such that the user can selectively program said control circuit as desired.

3. The controller of claim 1, wherein said housing further comprising:
an eyelet integrally connected to said housing; and
a flexible cord positioned through said eyelet so that the user can wear said controller around a selected portion of the user's body.

4. The controller of claim 1, wherein said independent operating means comprises: a programmed computer software product for enabling the electronic device to perform a plurality of word processing tasks for displaying alphanumeric characters.

5. The controller of claim 1, wherein said independent operating means comprises: a programmed computer software product for enabling the electronic device to perform a plurality of Internet browsing tasks for accessing at least one web page using hypertext transfer protocol.

6. The controller of claim 1, wherein said independent operating means comprises: a programmed computer software product for enabling the electronic device to perform a plurality of gaming tasks for controlling a gaming figure during game play.

7. A hand-operable controller for providing a versatile interface through which a user can command a peripheral electronic device to perform multiple actions, said controller comprising:
an ergonomic housing including a communication link electrically matable to the electronic device, said housing being sized and shaped to be held in a user's hands during operating conditions, said housing including a plurality of controls for generating a plurality of control signals based upon a plurality of corresponding user inputs respectively, said housing having a general bat shape including integrally opposed arms defining bat wings respectively, said housing having top and bottom surfaces wherein selected ones of said controls are disposed on said top surface and other ones of said controls are disposed on said bottom surface respectively; and
a control circuit operably mated with said controls for processing and transmitting said control signals to the electronic device during operating conditions, said control circuit including means for allowing the user to independently operate at least one controller function such that the user can command the electronic device to perform a plurality of tasks unique to a joystick and a mouse and a keyboard respectively, said controls being selectively programmable between an application mode and an internet mode and a word mode so that the user can interchangeably perform the plurality of tasks with said independent operating means;

wherein said controls include a plurality of keys adapted between engaged and non-engaged positions thereby defining said Internet mode and said Applications mode respectively;

wherein a first group of said controls are situated subjacent to said keys on a left side of said controller;

when said controller is in said Internet mode, said first group of controls maximize, minimize, and close a web browser window respectively;

when said controller is in said Word mode, said first group of controls are IJ, KL, MN, OP, and QR letters, respectively;

when said controller is in said Internet Mode, a second group of said controls are "BOOK," "SEARCH," "LIST," "STOP," and "P" functions, respectively;

when said controller is in said Word mode, said second group of controls are ST, UV, WX, YZ, and "www" letters, respectively.

8. The controller of claim 7, wherein said housing comprises:
at least one bay for receiving said control circuit therein such that the user can selectively program said control circuit as desired.

9. The controller of claim 7, wherein said housing further comprising:
an eyelet integrally connected to said housing; and
a flexible cord positioned through said eyelet so that the user can wear said controller around a selected portion of the user's body.

10. The controller of claim 7, wherein said independent operating means comprises: a programmed computer software product for enabling the electronic device to perform a plurality of word processing tasks for displaying alphanumeric characters.

11. The controller of claim 7, wherein said independent operating means comprises: a programmed computer software product for enabling the electronic device to perform a plurality of Internet browsing tasks for accessing at least one web page using hypertext transfer protocol.

12. The controller of claim 7, wherein said independent operating means comprises: a programmed computer software product for enabling the electronic device to perform a plurality of gaming tasks for controlling a gaming figure during game play.

* * * * *